(No Model.)

A. R. BIDWELL.
BRAKE SHOE.

No. 309,287. Patented Dec. 16, 1884.

Witnesses:
Geo. H. Strong
J. H. Nourse

Inventor,
A. R. Bidwell
By Dewey & Co.
Attorneys

UNITED STATES PATENT OFFICE.

AUGUSTUS R. BIDWELL, OF GREENVILLE, CALIFORNIA.

BRAKE-SHOE.

SPECIFICATION forming part of Letters Patent No. 309,287, dated December 16, 1884.

Application filed May 16, 1884. (No model.)

*To all whom it may concern:*

Be it known that I, AUGUSTUS R. BIDWELL, of Greenville, county of Plumas, and State of California, have invented an Improvement in Brake-Blocks; and I hereby declare the following to be a full, clear, and exact description thereof.

My invention relates to a new and useful brake-block of that class in which a two-part block is made to inclose and secure the rubber.

My invention consists of a peculiar two-part block adapted to fit the brake-rod, and by means of the nut on its end to be forced together against the shoulder on the rod, to clamp the rubber between the parts of the block; and, in connection with said block, my invention further consists in a rubber cut from wood across the grain, and so secured in the block as to present its cross-grain to the wheel, all of which I shall hereinafter fully describe by reference to the accompanying drawings.

Figure 3:
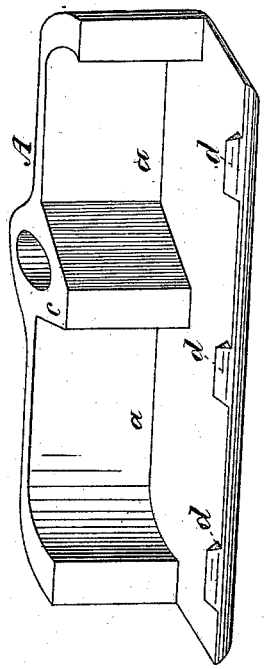
Figure 2:
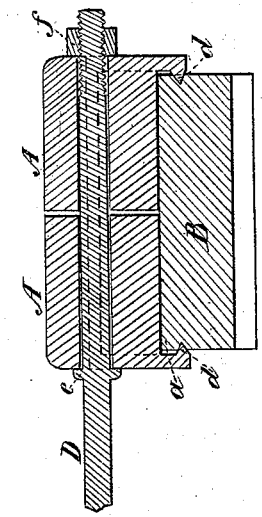
Figure 1:
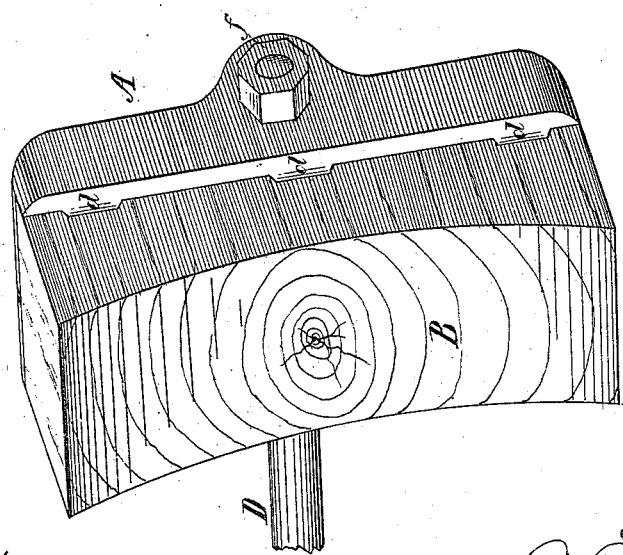

Figure 1 is a perspective view of my brake-block and rubber attached. Fig. 2 is a cross-section of same. Fig. 3 is a perspective view of one-half the block.

The object of my invention is to provide a block which shall hold the rubber securely, and yet be readily adapted to be separated to release the rubber for the substitution of a new one, and also to provide a lasting and efficient rubber. It is also intended to provide a convenient and efficient means of adjusting the block on the brake-roller, so that the rubber can always be brought to bear evenly on the rim of the wheel as the springs of the vehicle are more or less depressed as the load is varied.

A represents a casting of one half the block. The other half is like it. This casting is made with a back and a side at right angles, and when two are fitted together they form a chamber, $a$, in which the rubber B is secured. The casting is provided on the center of its back with an enlarged portion or hub, $c$, perforated as shown. On the inner edge of its side are cast inwardly-projecting teeth $d$.

D is the oscillating or rocking brake-rod of a wagon, having a shoulder, $e$, and a threaded end adapted to receive a nut, $f$. One half the block is first fitted on the end of rod D, which passes through its perforated hub. It is then pushed up against shoulder $e$. The other half is likewise fitted on the rod, and before it is pressed up close, and while the chamber $a$ is still expanded, the rubber B is inserted in said chamber. Then the nut $f$ is set up until the rubber is firmly clamped between the two parts, the teeth $d$ of which penetrate the rubber and hold it securely. The rubber is made but a trifle, if any, wider than the chamber $a$, so that when the two parts are brought together they touch at their hubs and back edges; hence the nut $f$ secures the block solidly against shoulder $e$, so that when the block is set in its proper position with reference to the wheel it remains so until the rubber requires renewal. The usual material for brake-rubbers is some hard wood. This, it is obvious, must be cut with the grain, for if it were cut across the grain and the cross end presented as the rubbing-surface, it would immediately break; and yet, if the rubber could be so cut and held securely enough to be prevented from splitting, a great advantage would be obtained, for then the rubbers would wear much longer, and as a consequence rubbers could be made of any kind of wood, which would last longer than the hardest wood when cut in the ordinary way. This very result I am enabled to obtain by reason of my block. I cut the rubber B, as indicated in the drawings, across the grain, and present as the friction-surface this cross-cut grain, Fig. 1. The great clamping-power of the block holds the rubber and effectually prevents it (as I have found by experience) from breaking or splitting, thus giving me a rubber which, though made of pine, is as hard and lasting as the hardest woods.

When I desire to replace a rubber, I loosen nut $f$ and slip the outer half of the block away sufficiently to expand chamber $a$, when the rubber may be taken out and a new one substituted. If the rubber is not wearing evenly at top and bottom, or the springs are depressed by an increased load, the slight loosening of nut $f$ admits of the instant adjustment of the block to the proper angle or position. The nut being again tightened, the block remains where placed.

As is well known in experience, wooden blocks cannot be screwed tight enough to prevent their turning, while blocks adapted to adjust themselves to the wheel are very apt to wear most at top or bottom.

My invention provides a block that is readily adjusted, and when once placed is bound to remain in position.

I am well aware that two-part brake-blocks, between which the rubber lies, are known; but in the only one which is adapted for light wagons the rubber is made with a tapering tenon, which is adapted to fit in a corresponding tapering socket in the block, and is held therein not by the clamping of the block itself, but by reason of the brake-rod passing through its tenon, and the tapering shape of said tenon and its socket. In this device to which I refer there can, in fact, be no clamping, because the block is loosely mounted on the rod to accomplish the result of always fitting the wheel, and if one side were set up to clamp the rubber it would drive the other against the shoulder on the rod and prevent it from accomplishing one of the principal objects of its construction.

I am also aware of clamping-irons extensible on each other by means of slots and bolts being used on heavy brake-beams, such as are used on farm and freight wagons, and for which class of vehicles only are they adapted; but in my device the rubber is held by clamping it between the parts of the block, which embeds its teeth into it and holds it so firmly that I am enabled to use rubbers cut from wood across the grain, as I have hereinbefore described.

It is intended to make the block of malleable cast-iron or cast-steel.

Having thus described my invention, what I claim as new, and desire to secure by Letters Patent, is—

1. In combination with the brake-rod D, having a shoulder, e, and a threaded end, and the setting-up nut f, the counterpart sections or halves A of a brake-block, formed each with a back and a side at right angles, whereby a chamber, a, is formed between them, said block having a perforated hub on its back, whereby it is fitted on the brake-rod, and the intervening rubber, B, cut from wood across the grain, and clamped in the chamber a by setting up the nut, substantially as herein described.

2. In combination with the brake-rod D, having a shoulder, e, and a threaded end, and the setting-up nut f, the counterpart sections or halves A of a brake-block, formed each with a back and side at right angles, whereby a chamber, a, is formed between them, said block cut from wood across the grain, and having teeth d on its edges, projecting within the chamber, a perforated back or hub, c, for fitting the brake-rod, and the intervening rubber, B, clamped in the chamber a, and impaled by the teeth by setting up the nut, substantially as herein described.

3. The two-part brake-block consisting of the counterpart sections or halves A, forming a chamber, a, with side teeth, d, said block being fitted on a brake-rod, and adapted to be forced together by a nut, in combination with a rubber, B, cut from wood across the grain, and clamped within the chamber a, as described, in a manner to present its cross-grain to the wheel, substantially as herein described.

In witness whereof I have hereunto set my hand.

AUGUSTUS R. BIDWELL.

Witnesses:
J. HARLAND,
JOHN M. BETTS.